United States Patent
Dry (10) Patent No.: US 9,527,417 B2
(45) Date of Patent: Dec. 27, 2016

(54) AIR-SUSPENDED SEAT SURFACES FOR FOLDING VEHICLE SEATS

(71) Applicant: Ford Global Technologies, LLC, Dearborn, MI (US)

(72) Inventor: Alan George Dry, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/623,957

(22) Filed: Feb. 17, 2015

(65) Prior Publication Data

US 2016/0236597 A1   Aug. 18, 2016

(51) Int. Cl.
*A47C 3/00* (2006.01)
*B60N 2/52* (2006.01)
*B60N 2/20* (2006.01)
*B60N 2/50* (2006.01)
*B60N 2/58* (2006.01)

(52) U.S. Cl.
CPC .............. *B60N 2/525* (2013.01); *B60N 2/20* (2013.01); *B60N 2/502* (2013.01); *B60N 2/58* (2013.01)

(58) Field of Classification Search
CPC ............ B60N 2/54; B60N 2/525; B60N 2/20; B60N 2/502; B60N 2/58; B60N 2/4415
USPC ..... 297/452.41, 284.6, 284.1, 284.2, 284.11, 297/378.1, 199, 200, DIG. 3
See application file for complete search history.

(56) References Cited

U.S. PATENT DOCUMENTS

| | | | | |
|---|---|---|---|---|
| 3,330,598 A | * | 7/1967 | Whiteside | A47C 4/54 297/284.3 |
| 3,363,941 A | * | 1/1968 | Wierwille | A47C 4/54 297/284.3 |
| 3,730,588 A | | 5/1973 | Braun | |
| 3,792,501 A | * | 2/1974 | Kery | A47C 4/54 297/452.41 |
| 4,017,118 A | * | 4/1977 | Cawley | A61G 15/02 297/284.3 |
| 4,018,477 A | | 4/1977 | Hogan | |
| 4,145,083 A | * | 3/1979 | Urban | A47C 31/126 297/284.1 |
| 4,316,631 A | | 2/1982 | Lenz et al. | |
| 4,536,030 A | | 8/1985 | Sakurada et al. | |
| 4,592,588 A | * | 6/1986 | Isono | A47C 7/022 297/284.11 |
| 4,615,563 A | * | 10/1986 | Kobayashi | A47C 7/022 297/284.11 |
| 4,629,248 A | | 12/1986 | Mawbey | |
| 4,634,179 A | * | 1/1987 | Hashimoto | A47C 7/467 297/284.3 |

(Continued)

FOREIGN PATENT DOCUMENTS

DE            10158876 A1   6/2003
DE       102004017212 B3   6/2005

*Primary Examiner* — Jose V Chen
(74) *Attorney, Agent, or Firm* — Vichit Chea; Price Heneveld LLP (57) ABSTRACT

A vehicle seat includes a cushion having a coverstock defining a seat surface with a flexible central region and a flexible edge region. The vehicle seat further includes a compressible edge bladder beneath the coverstock edge region and a first compressible inflation bladder positioned beneath the coverstock central region and in fluidic communication with the edge bladder. A first fixed quantity of a flowable medium is contained in and partially transferrable between the edge bladder and the inflation bladder.

18 Claims, 9 Drawing Sheets

(56) References Cited

U.S. PATENT DOCUMENTS

| | | | |
|---|---|---|---|
| 4,722,550 A * | 2/1988 | Imaoka | A47C 7/022 180/268 |
| 4,761,011 A * | 8/1988 | Sereboff | A47C 4/54 297/284.3 |
| 4,840,425 A * | 6/1989 | Noble | A47C 7/467 297/284.1 |
| 4,909,568 A | 3/1990 | Dal Monte | |
| 4,965,899 A | 10/1990 | Sekido et al. | |
| 5,082,326 A * | 1/1992 | Sekido | B60N 2/4415 297/284.6 |
| 5,135,282 A * | 8/1992 | Pappers | B60N 2/448 297/284.3 |
| 5,433,506 A * | 7/1995 | Jensen | A47C 4/54 297/284.3 |
| 5,529,377 A * | 6/1996 | Miller | B60N 2/4415 297/284.6 |
| 5,584,085 A | 12/1996 | Banko | |
| 5,662,384 A * | 9/1997 | O'Neill | A47C 4/54 297/284.6 |
| 5,860,705 A * | 1/1999 | Ridder | A47C 27/085 297/284.1 |
| 5,879,053 A | 3/1999 | Lux et al. | |
| 6,036,265 A | 3/2000 | Cosentino | |
| 6,203,105 B1 * | 3/2001 | Rhodes, Jr. | A47C 4/54 297/284.1 |
| 6,206,474 B1 * | 3/2001 | Kruse | B60N 2/70 297/284.3 |
| 6,234,578 B1 * | 5/2001 | Barton | A47C 4/54 297/452.41 |
| 6,386,633 B1 | 5/2002 | Newton | |
| 6,450,579 B1 | 9/2002 | Nylander et al. | |
| 6,554,360 B1 | 4/2003 | Wilke et al. | |
| 6,623,076 B2 | 9/2003 | Klingler | |
| 6,823,549 B1 * | 11/2004 | Hampton | A61G 7/05776 297/284.6 |
| 6,865,825 B2 | 3/2005 | Bailey, Sr. et al. | |
| 6,905,170 B2 | 6/2005 | McMillen et al. | |
| 7,086,700 B2 | 8/2006 | Habedank | |
| 7,108,323 B2 | 9/2006 | Welch et al. | |
| 7,225,486 B2 | 6/2007 | Jackson, III | |
| 7,255,399 B2 | 8/2007 | White et al. | |
| 7,311,358 B2 | 12/2007 | White et al. | |
| 7,364,229 B2 * | 4/2008 | Lee | B60N 2/5635 297/180.16 |
| 7,490,900 B2 | 2/2009 | Szczudrawa | |
| 7,874,618 B2 | 1/2011 | Kohl et al. | |
| 8,275,514 B2 * | 9/2012 | Hwang | B60N 2/4415 297/284.6 |
| 8,944,504 B2 | 2/2015 | Zimmerman, II | |
| 9,211,824 B2 * | 12/2015 | Arant | B60N 2/62 |
| 2006/0061183 A1 | 3/2006 | White et al. | |
| 2013/0062920 A1 * | 3/2013 | McDiarmid | A47C 4/54 297/284.6 |

\* cited by examiner

AIR-SUSPENDED SEAT SURFACES FOR FOLDING VEHICLE SEATS

FIELD OF THE INVENTION

The present invention generally relates to a vehicle seat having compressible portions to facilitate folding of the seat. The compressible portions can be inflated into extended positions during use of the seat.

BACKGROUND OF THE INVENTION

Vehicles may include foldable seats in which a seatback thereof can be rotated in a downward direction into contact with a corresponding cushion. Folding seats can be used in connection with, for example, the rear seats of a vehicle such that the seatbacks thereof can be folded, when not occupied by a passenger or the like, to expand the cargo area provided by the trunk of the vehicle. Accordingly, the degree to which the seatback can be folded impacts the useable cargo area achieved by such folding. Due to ergonomic and other concerns, seatbacks and cushions may have contours and thicknesses that limit the folding of the seatback such that a rear surface of the seatback, on which cargo is supported, is angled significantly upward from the adjacent trunk surface. This can impact both the useable cargo space, as well as the ability to reliably place objects on the sloped surface. Accordingly, improvements to vehicle seats are desired that allow for a greater degree of folding.

SUMMARY OF THE INVENTION

According to one aspect of the present invention, a vehicle seat includes a cushion having a coverstock defining a seat surface with a flexible central region and a flexible edge region. The vehicle seat further includes a compressible edge bladder beneath the coverstock edge region and a first compressible inflation bladder positioned beneath the coverstock central region and in fluidic communication with the edge bladder. A first fixed quantity of a flowable medium is contained in and partially transferrable between the edge bladder and the inflation bladder.

According to another aspect of the present invention, a seat cushion for a vehicle includes a coverstock defining a seat surface with a flexible central region and a flexible edge region. The seat cushion further includes a first compressible edge bladder beneath the coverstock edge region and a first compressible inflation bladder positioned beneath the coverstock central region and in fluidic communication with the edge bladder. A first fixed quantity of a flowable medium is contained in and partially transferrable between the edge bladder and the inflation bladder.

According to another aspect of the present invention, a vehicle seat includes a cushion having an edge bladder within an edge region thereof and an inflation bladder within the cushion remote from the edge region. A seatback is rotatably coupled with the cushion and includes an upper bladder within an upper region thereof. The inflation bladder is in communication with the edge bladder and the upper bladder and defines a closed unit therewith containing a fixed quantity of a flowable medium.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
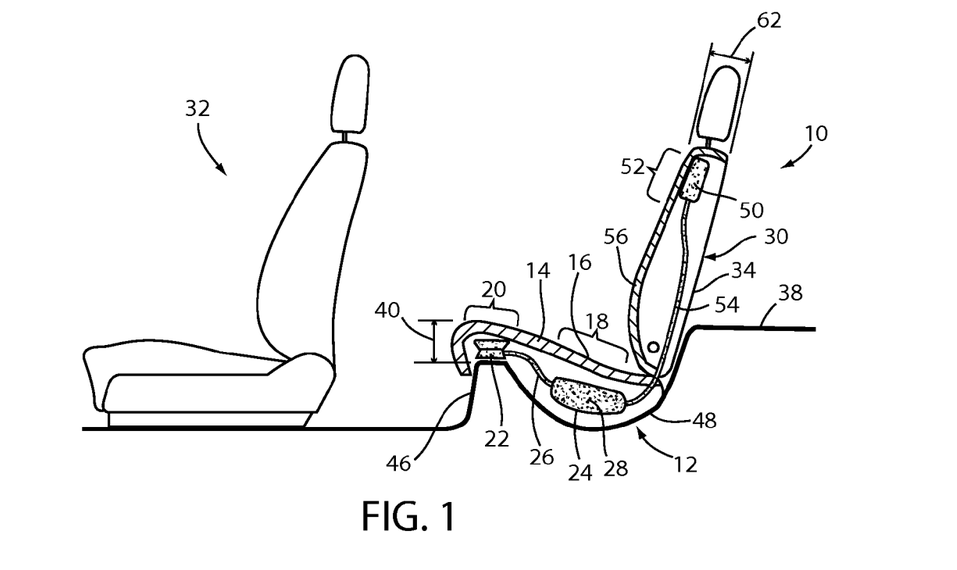
FIG. 1 is a side view of a portion of a vehicle interior including a foldable vehicle seat according to an embodiment of the disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a vehicle seat. Vehicle seat 10 includes a cushion 12 having a cushion coverstock 14 defining a seat surface 16 with a flexible central region 18 and a flexible edge region 20. A compressible edge bladder 22 is located beneath the edge region 20 of cushion coverstock 14 and a first compressible inflation bladder 24 is positioned beneath central region 18 of coverstock 14 and is in fluidic communication with the edge bladder 22 (such as by connection therewith by a cushion tube 26). A first fixed quantity of a flowable medium 28 (such as air or other various inert, non-reactive gasses or mixtures thereof) is contained in and is partially transferrable between the edge bladder 22 and the inflation bladder 24.

Figure 2:
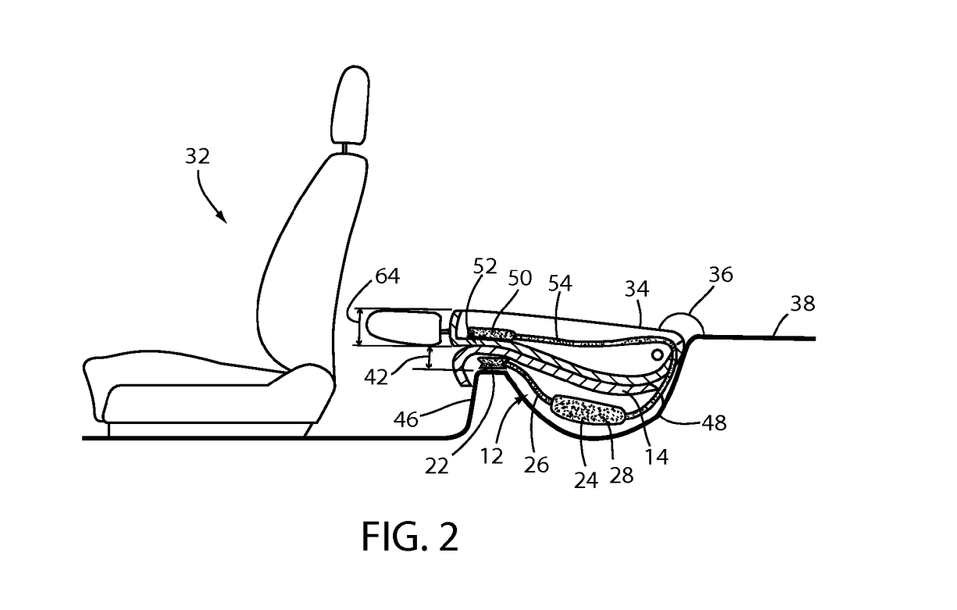
FIG. 2 is a side view of the vehicle interior portion including the foldable vehicle seat of FIG. 1 with the seat in a folded configuration.
Figure 3:
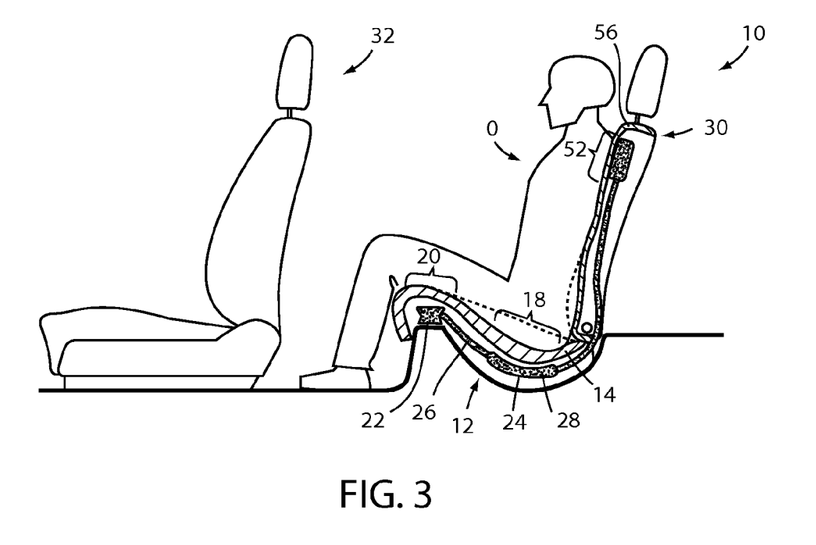
FIG. 3 is a is a side view of the vehicle interior portion including the foldable vehicle seat of FIG. 1 with the seat in an open configuration with an occupant therein.
Figure 4:
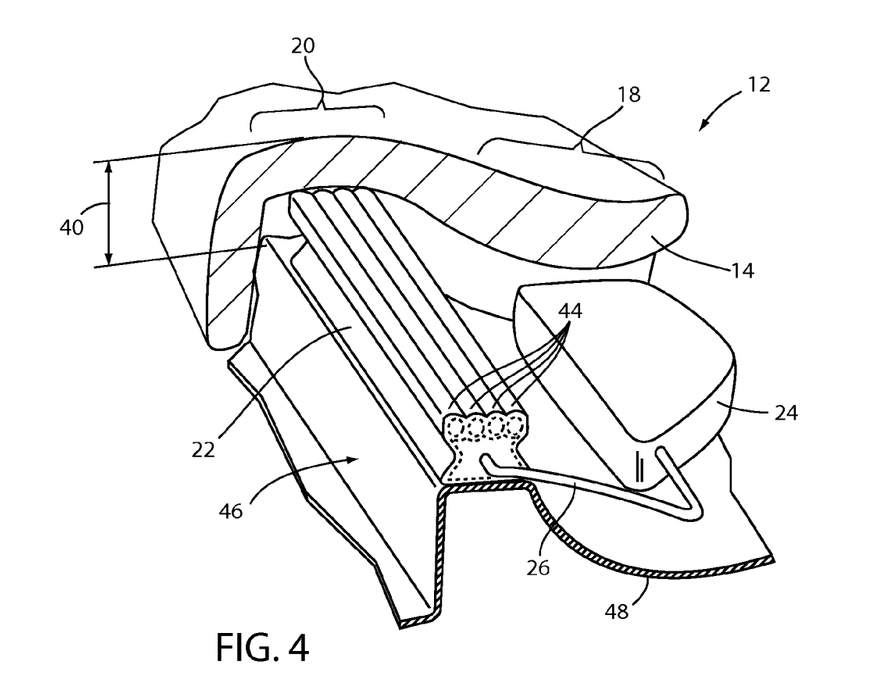
FIG. 4 is a partial cutaway view of a portion of the foldable vehicle seat of FIG. 1.

As shown in FIGS. 1-3, vehicle seat 10 can include a seatback 30 that can be rotatably coupled with cushion 12 such that seatback 30 can be configured in an open position wherein the seatback 30 is away from edge region 20 (as shown in FIG. 1) and a folded, or closed, position (as shown in FIG. 2), wherein a portion of seatback 30 is in contact with edge region 20. In general, the structure of vehicle seat 10 may be similar to that which may be typically found in connection with the rear seats of a vehicle, whereby the folding provided by vehicle seat 10 (as shown in FIG. 2) can be used to increase the cargo capacity of an adjacent trunk of the associated vehicle. Such a folding configuration can also be used in one or more of the front seats 32 of the associated vehicle, such as the passenger-side front seat 32. Accordingly, the various features of vehicle seat 10 discussed herein may be particularly described with reference to a vehicle seat 10 positioned toward the rear of the associated vehicle, and maybe implemented in connection with, for example, a rear bench-style seat (such as a 60/40 split-folding rear bench), rear captain-style seats, or the like. Such features, however, may also be usable in connection with a front passenger seat 32.

With continued reference to FIGS. 1-3, the incorporation of inflation bladder 24 and edge bladder 22 connected, for example, by tube 26 (which couples with edge bladder 22 and inflation bladder 24 on opposite ends thereof), can provide for an alteration of the profile of cushion 12 when seat 10 is unoccupied such that an angle 36 of rear seat surface 34 with respect to trunk floor 38 of about 6°, or less can be achieved. Further, such features may allow cushion 12 to provide a comfortable and safe contour for an occupant O when seated thereon, as shown in FIG. 3. In particular, the various features of cushion 12 provide for such variation in the contour of seat surface 16 by facilitating transfer of flowable medium 28 between inflation bladder 24 and edge bladder 22 under various circumstances. In particular, both edge bladder 22 and inflation bladder 24 can both be generally compressible and/or flexible such that they can be compressed or expanded by variation in pressure either interior or exterior thereof.

Edge bladder 22, inflation bladder 24, and tube 26 can be of a generally air-impermeable material, such as plastic or the like such that the edge bladder 22, inflation bladder 24, and tube 26 define a closed unit or system containing a fixed quantity of flowable medium 28 therein. In an example, edge bladder 22 and inflation bladder 24 can be configured to contain the flowable medium 28 at a pressure of up to about 3 pounds per square inch gauge ("p.s.i.g."), but can be inflated with flowable medium 28 to between about one-third and one-half of such maximum pressure, or between about 0.5 p.s.i.g. and 1.0 p.s.i.g. Accordingly, an increase in external pressure over one of either edge bladder 22 or inflation bladder 24 can cause at least a portion of the flowable medium 28 within such structure to transfer and increase the interior pressure of such flowable medium 28 within the other of such structures. In this manner, the pressure of flowable medium 28 within the closed structure of edge bladder 22, inflation bladder 24, and tube 26 can reach a consistent, equilibrium pressure within such unit.

The above-described transfer of flowable medium 28 between edge bladder 22 and inflation bladder 24 by pressure applied to inflation bladder 24 may result in compression of inflation bladder 24 and a corresponding inflation, or at least an increase of the pressure of flowable medium 28 therein, of edge bladder 22 (so long as any external pressure applied to edge bladder 22 is less than the pressure by which inflation bladder 24 is compressed). As shown in FIG. 3, this transfer is carried out when an occupant O is seated on the vehicle seat 10, wherein a majority of the weight of occupant O is centered over central region 18 of seat surface 16 and, accordingly on inflation bladder 24, which is positioned therebeneath. The weight of occupant O on inflation bladder 24 applies pressure thereon, thereby transferring an amount of the flowable medium 28 to edge bladder 22, which causes edge bladder 22 to inflate or expand under pressure, thereby providing a retention, or supporting, force to support edge region 20 of seat surface 16 above an underlying portion 46, of floor pan 48 in a generally elevated position sufficient to maintain edge region 20 in contact with portions of occupant O thereover (at least when occupant O is in a neutral seated position).

As shown in FIG. 1, where no occupant O is seated in vehicle seat 10, edge bladder 22 and inflation bladder 24 may be in a generally neutral state, which may at least be partially dictated by the natural position of seat surface 16, as dictated by coverstock 14. In general, coverstock 14 may be comprised of various layers of foam and fabric or leather and may result in a flexible structure such that the various portions thereof are moveable by, for example, a force applied thereto causing compression of the underlying structure (including edge bladder 22 and inflation bladder 24) or by expansion of either of edge bladder 22 or inflation bladder 24, as discussed further below. When seatback 30 is rotated into a folder position, as shown in FIG. 2, a portion of seatback 30 may be brought into contact with edge region 20 of cushion 12. A force applied to seatback 30, when positioned as such, may increase the pressure of the flowable medium 28 within edge bladder 22, thereby compression edge bladder 22 by movement of the edge region 20 of coverstock 14 into a compressed position (FIG. 2), thereby correspondingly increasing the pressure of the flowable medium 28 within inflation bladder 24 and allowing seatback 30 to fold to a generally flatter position (i.e. of a higher angle 36) then would be possible without the compression of edge region 20.

Figure 5:
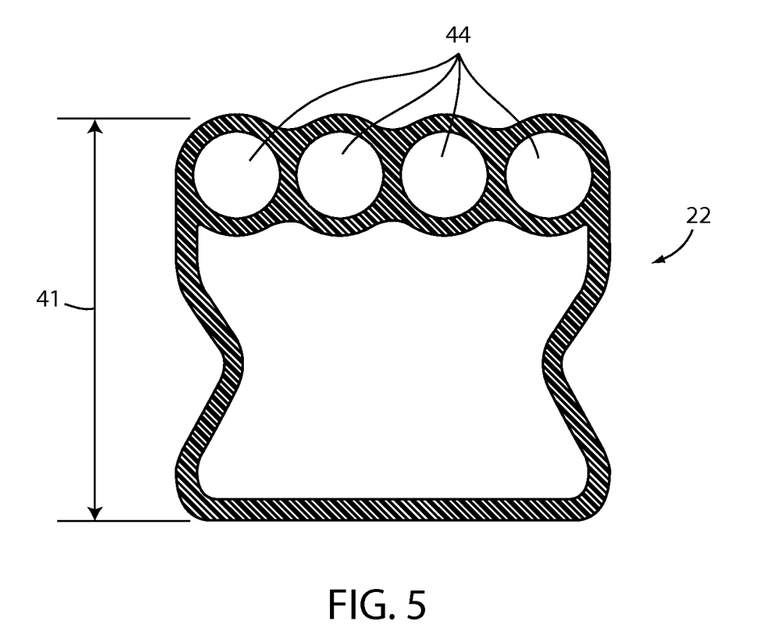
FIG. 5 is a side, cross section view of a collapsible bladder useable in the foldable vehicle seat of FIG. 1, the bladder being shown in an inflated state.
Figure 6:
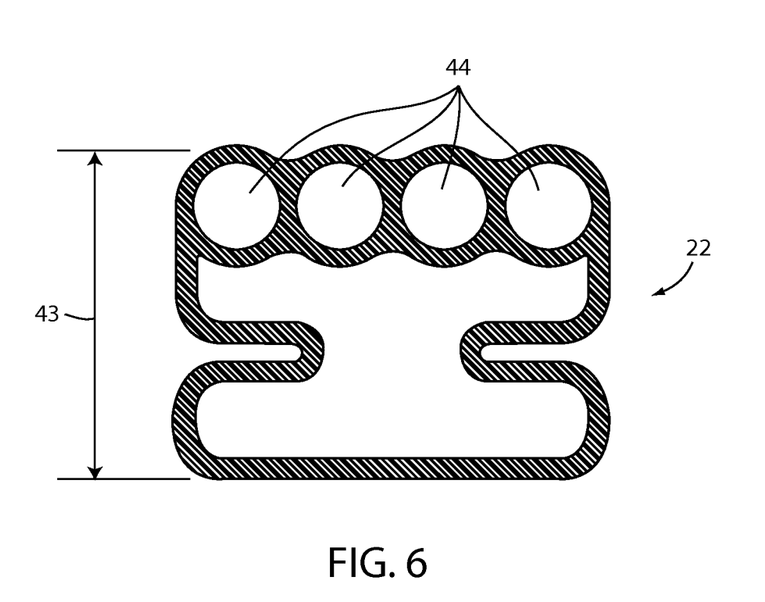
FIG. 6 is a side, cross section view of the collapsible bladder of FIG. 5 in a collapsed state.

As shown in FIGS. 5 and 6, the above-described compression of edge bladder 22 can allow for a change (and/or thickness) of edge bladder 22. As shown in FIG. 5, when edge bladder 22 is in an inflated state, edge bladder 22 may have a height 41 that generally corresponds to the elevated position of edge region 20 of seat surface 16 (FIG. 3). Upon compression of edge bladder 22, as shown in FIG. 6, edge bladder 22 may have a height 43 that is less than height 41 thereof in the inflated state, and which may correspond to the position of edge region 20 of seat surface 16 when in the compressed position (FIG. 2). In an example, edge bladder 22 may be configured such that height 43 is less than height 41 by at least about 20 mm, and in one example between about 30 mm and 40 mm, thereby facilitating similar compression of edge region 20 of cushion 12. In an example, height 43 of edge bladder 22 in the compressed position may be about 20.0 mm. Further, compression of edge bladder 22 may not be evenly-distributed in a direction from the front of cushion 12 to the rear thereof, the compression thereof being measured in such an example by a portion thereof that exhibits the greatest degree of compression.

As further illustrated in FIGS. 5 and 6, edge bladder 22 may define a plurality of fixed cells 44 which may substitute for all or a portion of any foam which may otherwise be present in coverstock 14 at least in the area of edge bladder 22. As illustrated, such fixed cells 44 do not appreciably expel any air or other medium contained therein during compression of edge bladder 22. Further, cells similar to fixed cells 44 may be present along a portion of inflation bladder 24 and/or along an entirety of seat surface 16 and also within seatback 30.

Returning now to FIGS. 1-3, vehicle seat 10 can include an additional bladder in the form of an upper bladder 50 within a flexible upper region 52 of seatback 30. As illustrated, in an embodiment upper bladder 50 can be connected with inflation bladder 24 by a seatback tube 54. In this manner, seatback tube 54 and upper bladder 50 can be included in the closed unit described above as including edge bladder 22, inflation bladder 24, and cushion tube 26. As such, upper bladder 50 can be of the same or similar material to edge bladder 22 and inflation bladder 24 so as to be generally compressible by resilient deformation thereof under pressure and may further be generally air impermeable such that the fixed quantity of flowable medium 28 can further be contained in upper bladder 50 and transferrable at least in part, between inflation bladder 24 and upper bladder 50 by seatback tube 54.

In a manner similar to edge bladder 22, described above, upper bladder 50 can support a portion of seatback coverstock 56 within upper region 52 thereof when upper bladder 50 is in an inflated or expanded state due to pressure on inflation bladder 24, such as by the weight of occupant O, as shown in FIG. 3. Further, a portion of flowable medium 28 can be expelled from upper bladder 50 and into inflation bladder 24 due to pressure applied to upper region 52, such as by forceable movement of seatback 30 into the folded position shown in FIG. 2. Such compression can allow for a decrease in thickness of seatback 30 adjacent upper region 52 by movement of seatback coverstock 56 within upper region 52 between an extended position and an inward position wherein a thickness of seatback 30 is greater when coverstock 56 is in the extended position (thickness 62 in FIG. 1) within upper region 52 than when in the compressed position (thickness 64 in FIG. 3). Such compressibility may further add to the ability of vehicle seat 10 to fold into a relatively flatter position. In such an embodiment, inflation bladder 24 can be sized to receive portions of flowable medium 28 from both upper bladder 50 and edge bladder 22 when both are in the compressed state.

Figure 7:
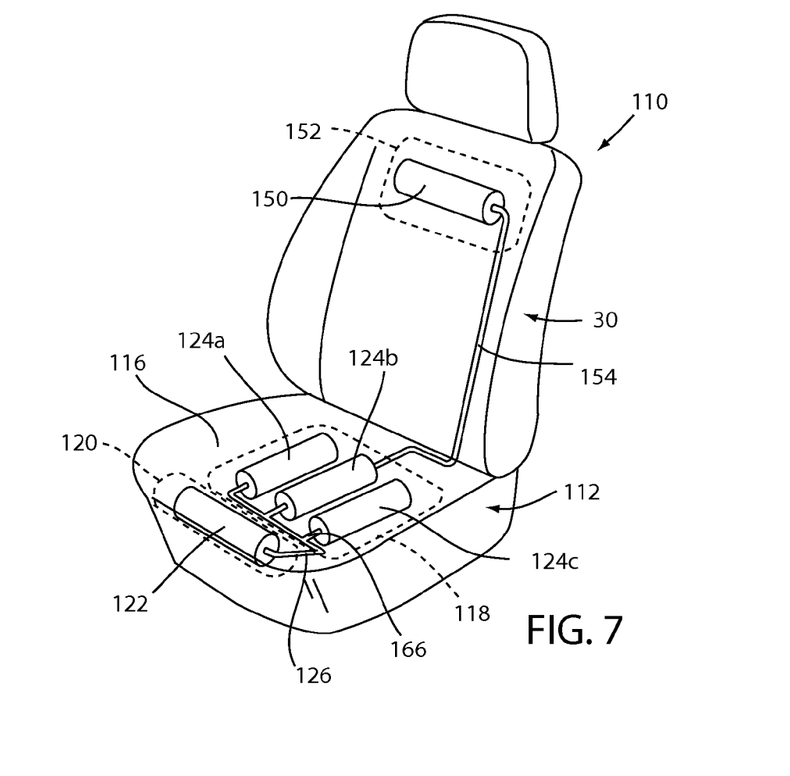
FIG. 7 is a front-perspective view of a foldable vehicle seat according to another embodiment of the disclosure.
Figure 8:
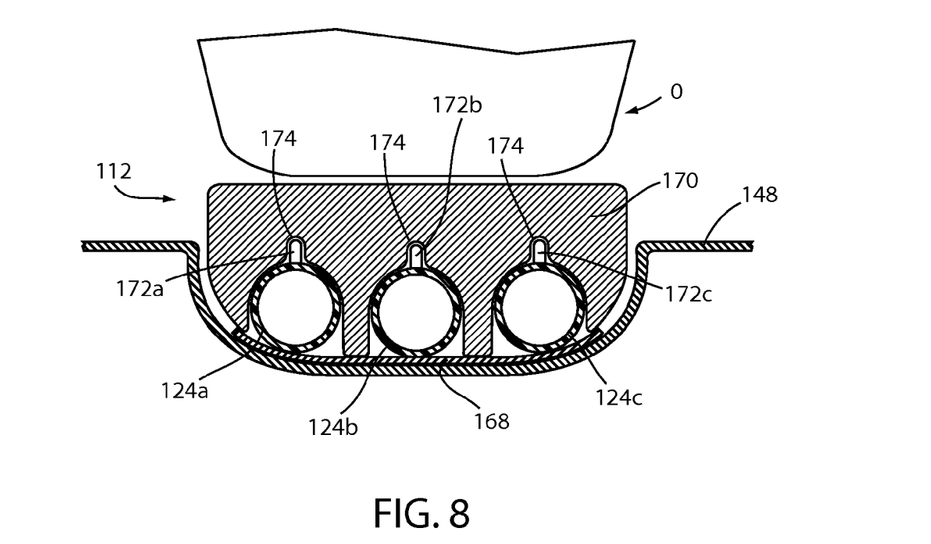
FIG. 8 is a front, cross section view of a portion of the foldable vehicle seat of FIG. 7.

In another example of a vehicle seat 110 shown in FIG. 7, vehicle seat 110 includes an inflatable and compressible edge bladder 122 as well as an inflatable and compressible upper bladder 150 and can, further, include a plurality of inflation bladders 124a, 124b, and 124c. In the example shown, a central one of the inflation bladders 124b can be connected with upper bladder 150 by seatback tube 154 such that compression of inflation bladder 124b causes inflation and/or expansion of upper bladder 150, and compression of upper bladder 150 is permitted absent a greater compressive force on inflation bladder 124b. Further, a corresponding pair of inflation bladders 124a and 124c, positioned laterally outside of and surrounding inflation bladder 124b on opposing sides thereof, are connected with edge bladder 122 by cushion tube 126 having a plurality of a branch 166 fluidically coupled with inflation bladder 126c. In this configuration, a pressure evenly distributed along central region 18 of seat surface 16 can provide for a greater quantity of air flow, and accordingly, a greater amount of pressure increase within edge bladder 122, as compared to upper bladder 150. Such as pressure differential may be advantageous, as the weight applied over edge region 120 may be greater than that applied on upper region 152 when an occupant is seated in vehicle seat 110.

Figure 9:
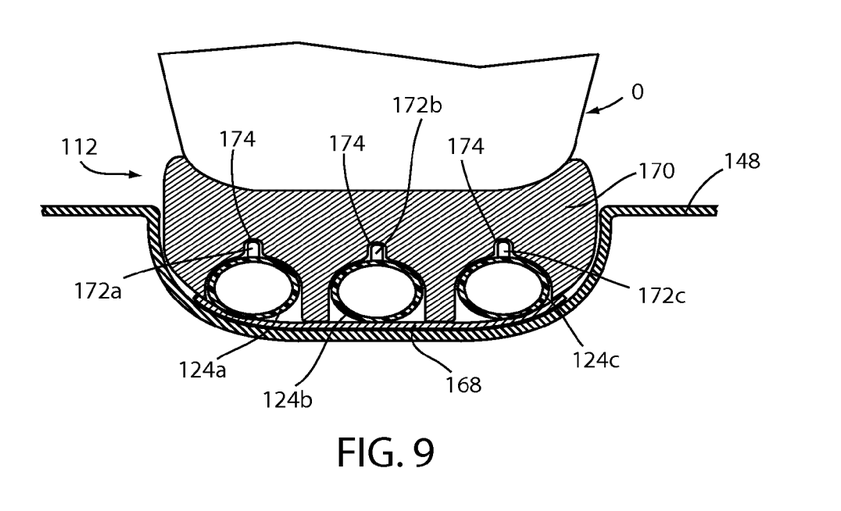
FIG. 9 is a front, cross section view of the foldable vehicle seat portion of FIG. 7 in a compressed state.

As shown in FIGS. 8-11, vehicle seat 110 may be specifically configured to retain inflation bladders 124 in a desired position within cushion 112. As such, cushion 112 may include a lower tray 168 configured for supporting inflation bladders 124a, 124b, and 124c and a cover foam unit 170 shaped to extend over and separate inflation bladders 124a, 124b, and 124c. Further, cover foam 170 may include a plurality of grooves 174 sized to receive therein corresponding ridges 172a, 172b, and 172c coupled with and extending from inflation bladders 124a, 124b, and 124c, respectively. Ridges 172 can be integrally formed with inflation bladders 124a, 124b, and 124c, such as by heat-sealing of excess material thereof by a distance corresponding to a desired height of ridges 172a, 172b, and 172c. Accordingly, when cover foam unit 170 is assembled over inflation bladders 124a, 124b, and 124c, ridges 172a, 172b, and 172c can be received in corresponding grooves 174a, 174b, and 174c, thereby helping to retain the desired position of inflation bladders 124a, 124b, and 124c, such as by prevention of rotation or twisting thereof. Such a configuration may be particularly useful in preventing such movement of inflation bladders 124a, 124b, and 124c during compression, such as by the weight of occupant O on cushion 12, as shown in FIG. 9.

Figure 10:
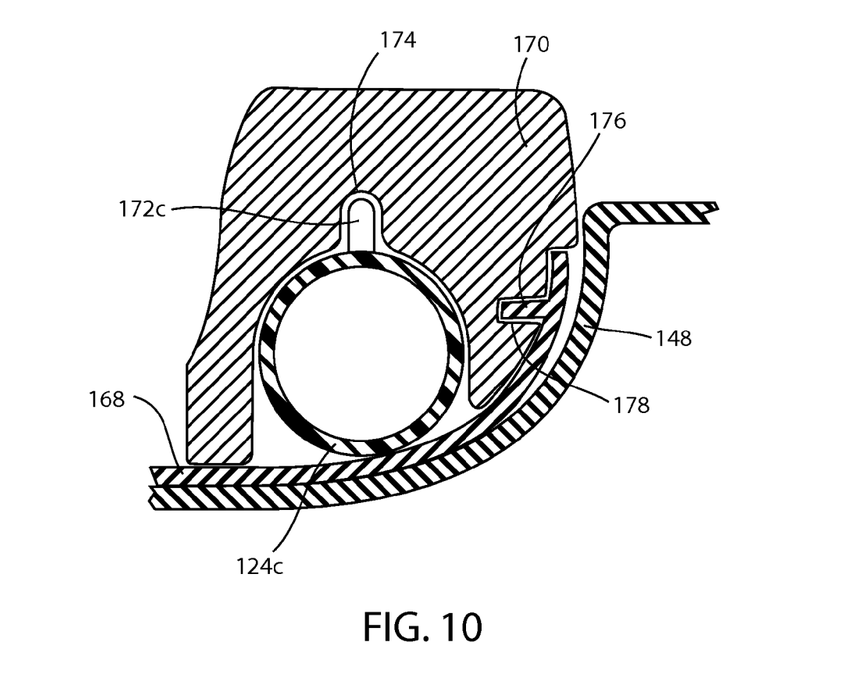
FIG. 10 is a detail, cross section view of the foldable vehicle seat portion of FIG. 7.
Figure 11:
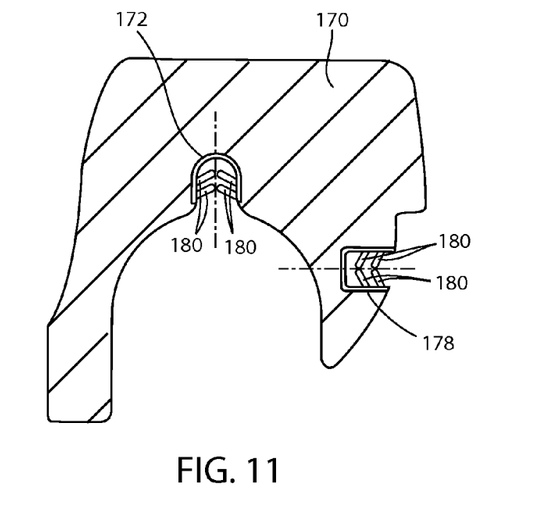
FIG. 11 is a further detail, cross section view of additional structures useable in connection with the foldable vehicle seat portion of FIG. 7.

As shown in FIG. 10, tray 168 may include additional ridges 176 extending therealong that correspond to grooves 178 formed in a portion of cover foam 170. Engagement of ridges 76 with grooves 78 facilitating coupling of cover foam 170 with tray 168, which may help to retain inflation bladders 124a, 124b, and 124c within cushion 12. To further facilitate retention of ridges 172 and/or ridges 76 within corresponding grooves 174 and 178 a plurality of resiliently deformable fins 180 may be coupled within grooves 174 and 178, such fins 180 extending toward a center of the corresponding grooves 174 or 180 and generally angling in a direction of insertion of the corresponding ridges 176 and 172, thereby allowing insertion thereof, but generally restricting withdrawal.

Figure 12:
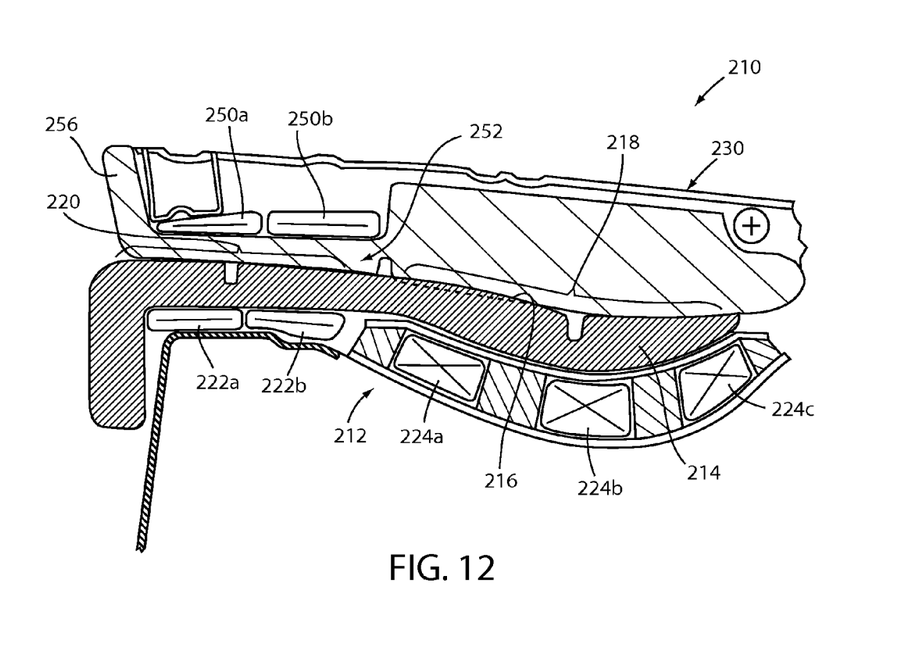
FIG. 12 is a side, cross section view of a foldable vehicle seat according to a further embodiment of the disclosure.

As shown in FIG. 12 in a variation, vehicle seat 210 can include a plurality of inflation bladders 224a, 224b, and 224c that extend laterally with respect to cushion 212 (i.e. in a direction in and out of the page with respect to FIG. 12). Further, vehicle seat 210 can include a plurality of edge bladders 222a and 222b, as well as a plurality of upper bladders 250a and 250b, all extending laterally with respect to edge region 220 and upper region 252, respectively. In such an arrangement, inflation bladder 224b can be connected by a tube (not shown) with both upper bladders 250a and 250b. Further, both of inflation bladders 224a and 224c can be fluidically coupled by a tube (not shown) with both edge bladders 222a and 222b. Alternatively, inflation bladder 224*a* can be fluidically coupled with edge bladder 222*b* and inflation bladder 224*c* can be fluidically coupled with edge bladder 222*a*, with other such combinations also being contemplated.

Figure 13:
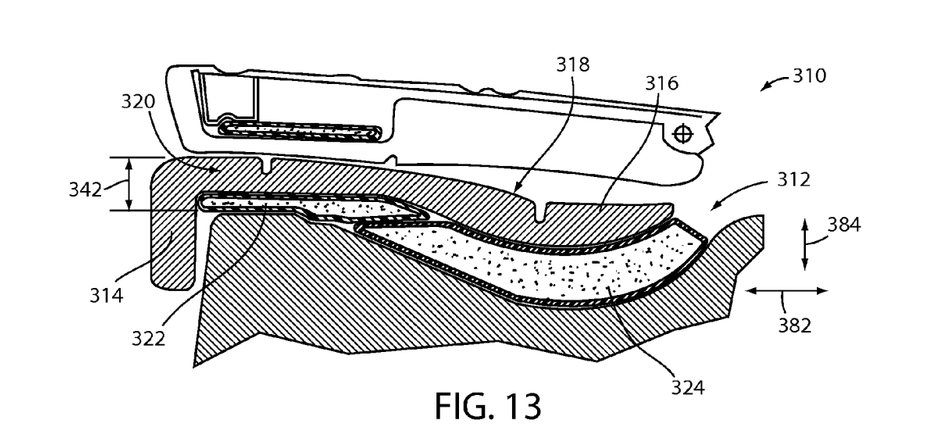
FIG. 13 is a side, cross section view of a foldable vehicle seat according to a still further embodiment of the disclosure, the vehicle seat shown in a folded state.
Figure 14:
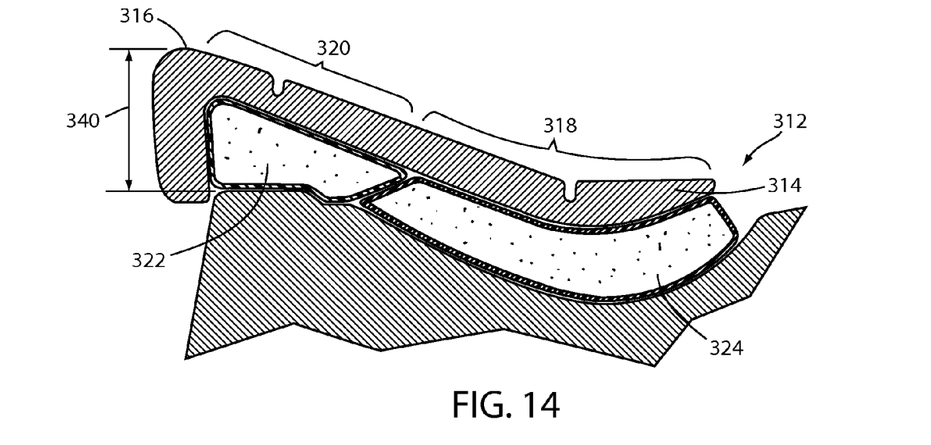
FIG. 14 is a side, cross section view of the foldable vehicle seat portion of FIG. 14 in an open, unoccupied state.
Figure 15:
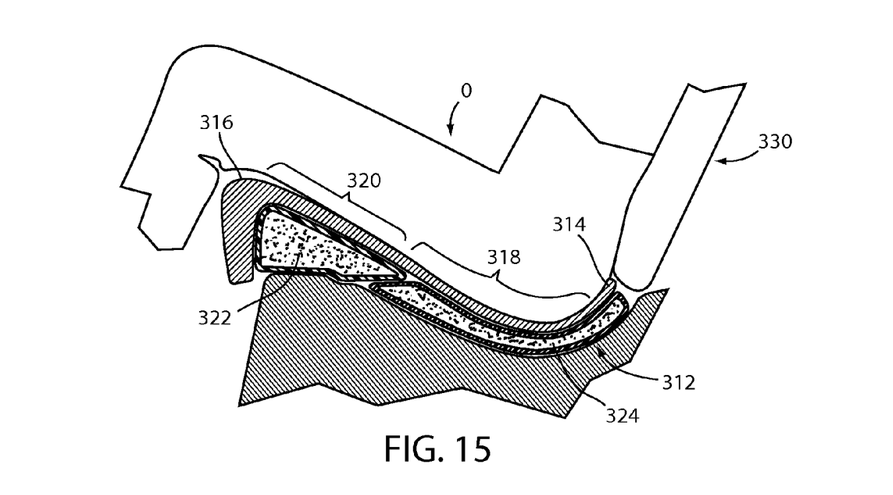
FIG. 15 is a side, cross section view of the foldable vehicle seat portion of FIG. 14 in an open, occupied state.

As shown in FIGS. 13-15, in a variation of vehicle seat 310 edge bladder 322 and inflation bladder 324 can be configured to extend substantially throughout the entirety of seat surface 316, including in a fore-aft direction within the associated vehicle. In such a configuration, edge bladder 322 can be configured to partially overlap with inflation bladder 324 in a vertical direction 384. The extension of edge bladder 322 and inflation bladder 324 throughout the entirety of seat surface 316 may help to provide reliable compression of inflation bladder 324 by an occupant O seated in vehicle seat 310, including by accommodating for various seating positions of occupant O with respect to vehicle seat 310. Further, the overlap between edge bladder 322 and inflation bladder 324 may help provide a generally smooth transition between such components when an occupant O is seated in vehicle seat 310, as shown in FIG. 15.

As shown in FIG. 13, vehicle seat 310 may function in a similar manner to other embodiments of vehicle seats discussed herein, including by allowing deflation of edge bladder 322 under pressure from a downwardly-folded seatback 330 against edge region 320 of cushion 312, including transfer of a portion of the flowable medium 328 from edge bladder 322 to inflation bladder 324. As shown in FIG. 14, absent any external pressure on seat surface 316, that natural shape of coverstock 314 may cause edge bladder 322 and inflation bladder 324 to be configured in a general neutral position, including positioning of edge region 320 in an elevated position. As shown in FIG. 15, pressure on inflation bladder 324 by the weight of an occupant O thereon, for example, may cause a transfer of flowable medium 328 from inflation bladder 324 into edge bladder 322, thereby providing an expansion force within edge bladder 322 sufficient to urge edge region 320 into the extended position and/or to maintain edge region 320 in such a position under the weight of the legs, for example, of occupant O thereon.

In an further variation of vehicle seat 310, shown in FIGS. 13-15, edge bladder 322 and inflation bladder 324 may be formed in a single bladder unit, such as by being formed in a unitary structure such as a larger bladder unit with division therebetween along the area of overlap 81 between the portion thereof designated as edge bladder 322 and the portion thereof designated as inflation bladder 324. In such a manner, inflation bladder 324 and edge bladder 322 may be in fluidic communication by one or more gaps (not shown) in a seam or other structure separating edge bladder 322 from inflation bladder 324.

Figure 16:
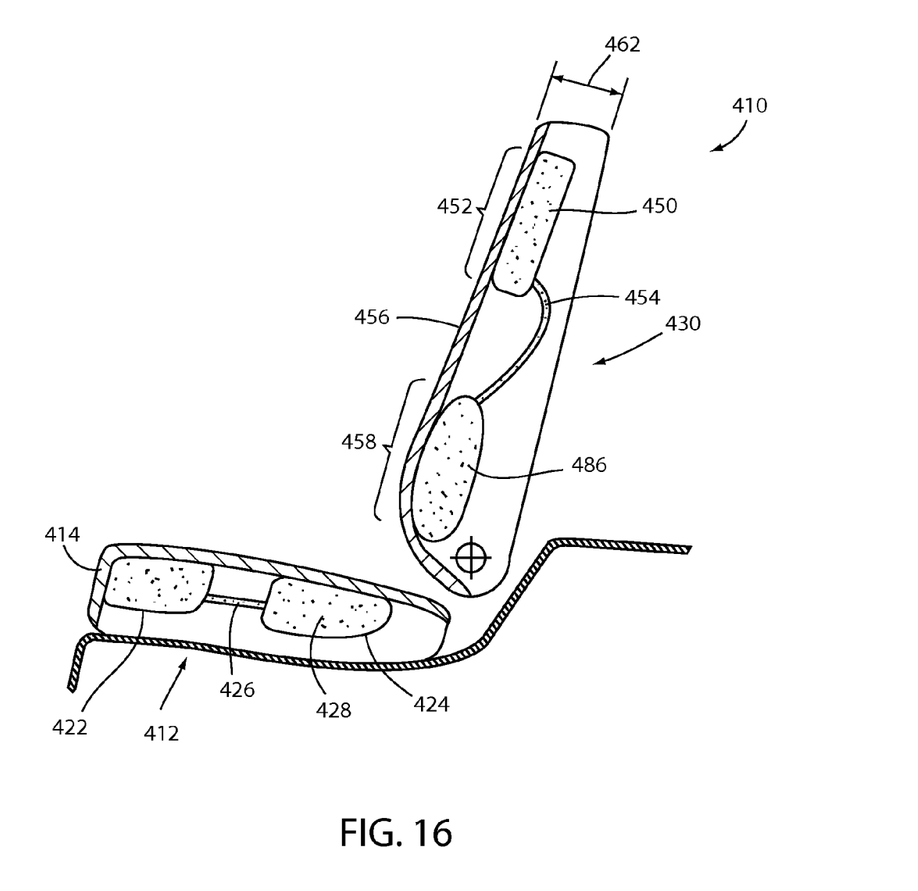
FIG. 16 is a side, cross section view of a foldable vehicle seat according to a still further embodiment of the disclosure, the vehicle seat shown in an open, unoccupied state.
Figure 17:
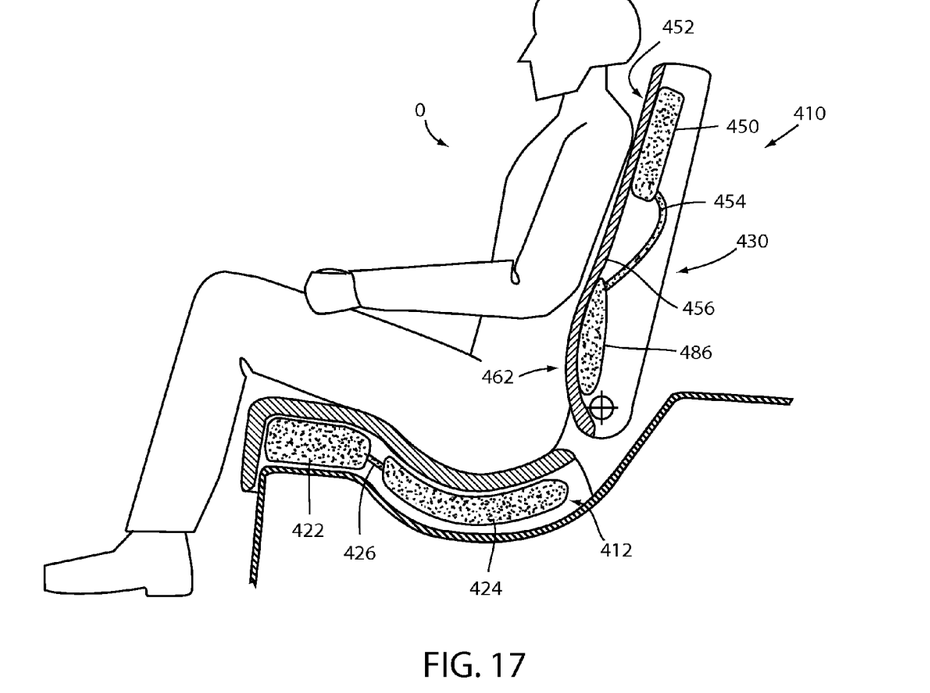
FIG. 17 is a side, cross section view of the foldable vehicle seat portion of FIG. 14 in an open, occupied state.
Figure 18:
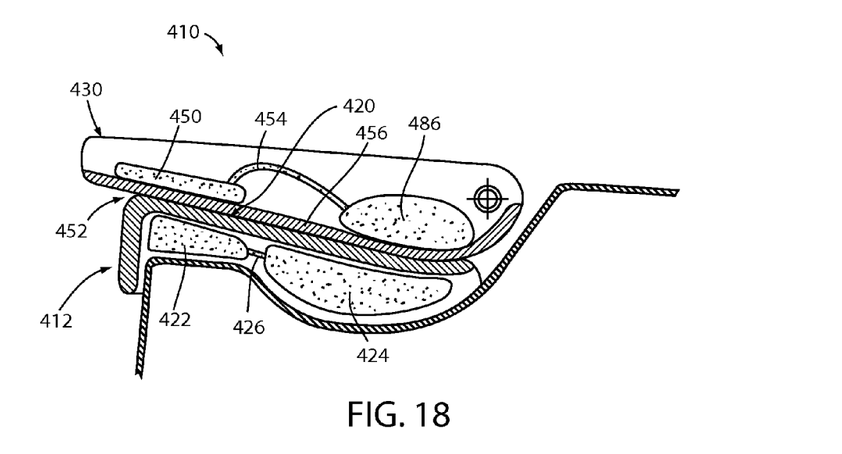
FIG. 18 is a side, cross section view of the foldable vehicle seat portion of FIG. 14 in a folded state.

Turning now to FIGS. 16-18, a further variation of vehicle seat 410 is shown, in which seatback 430 includes an upper bladder 450 positioned beneath an upper region 452 of seatback coverstock 456. Upper bladder 450 is of a similar construction to, for example, upper bladder 450 described above with respect to FIGS. 1-3 and is further compressible by expulsion of a portion of a flowable medium 428 contained therein under a pressure applied thereto and inflatable by transfer of a further portion of a flowable medium 428 thereinto. As illustrated, seatback 430 further includes a seatback inflation bladder 486 positioned therein and underlying a lower region 458 of seatback coverstock 456 that corresponds, for example, to the general area of seatback 430 that provides lumbar support for an occupant. Accordingly, a second fixed quantity of flowable medium 428 is contained within the closed unit formed by seatback inflation bladder 486, upper bladder 450 and seatback tube 454, which fluidically connects upper bladder 450 with seatback inflation bladder 486, As shown in FIG. 17, seatback inflation bladder 486 is compressible under the weight of a portion of occupant O (e.g. the lower back region) when seated in vehicle seat 410. Such compression of seatback inflation bladder 486 causes a portion of the fixed quantity of the flowable medium 428 into upper bladder 450, thereby increasing the pressure of the flowable medium 428 within upper bladder 450 and providing a corresponding force therein to retain the upper region 452 in an extended position (as shown in FIG. 17) to maintain upper region 452 of seatback coverstock 456 in general contact with an adjacent portion of occupant O. The pressure of the flowable medium 428 within seatback inflation bladder 486, upper bladder 450, and seatback tube 454 can be in the same general range of pressure for flowable medium 28 described above with respect to FIGS. 1-3.

With further reference to FIGS. 16 and 17, lower region 460 of seatback coverstock 456 can be generally flexible between an extended position (FIG. 16) and a compressed position (FIG. 17), with the extended position in FIG. 17 generally corresponding to a typical contour of a comparable region in an ordinary vehicle seatback for the support of an occupant's lumbar back area, with the compressed position shown in FIG. 16 flexing inwardly from the remaining portions of seatback coverstock 456 by an amount approximately equal to that would be ordinarily observed in a vehicle seat under the pressure of the back of an occupant. This configuration results inward flexing of lower region by occupant O in an ordinary seated position so as to move inflation bladder 486 into the compressed state shown in FIG. 17.

As shown in FIG. 18, when seatback inflation bladder 486 is in a neutral state, such as when not being compressed by the weight of an occupant in vehicle seat 410, upper bladder 450 is compressible so as to permit movement of the upper region 452 of seatback coverstock 456 to be moved into the corresponding compressed position, such as under forcible movement of seatback 430 into the folded position shown in FIG. 18, wherein edge region 420 of cushion 412 is pressed into upper region 452 of seatback coverstock 456. Such compression of upper region 452 and of upper bladder 450 can be generally similar to the compression thereof described above with respect to FIGS. 1-3.

In various embodiments of a vehicle seat 410 including a seatback 430, as described above, and further including seatback inflation bladder 486 fluidically coupled with upper bladder 450, the corresponding cushion 412 can itself include an inflation bladder 424 fluidically coupled with an edge bladder 422 in a similar manner to the various embodiments discussed above with respect to FIGS. 1-16. In such embodiments, inflation bladder 424 can be fluidically coupled with edge bladder 422 only and not with upper bladder 450. Further, various alternative embodiments of a seatback including an upper bladder coupled with a seatback inflation bladder can be similar to the various alternative embodiments of inflation bladder 124, inflation bladder 224, or inflation bladder 324, and corresponding variations of the edge bladder 122, 222, and 322, described above with respect to FIGS. 4-6, FIGS. 7-11, FIG. 12, and FIGS. 13-15.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

I claim:

1. A vehicle seat, comprising:
   a cushion including:
   a coverstock defining a seat surface with a flexible central region and a flexible edge region;
   a compressible edge bladder beneath the coverstock edge region;
   a first compressible inflation bladder positioned beneath the coverstock central region;
   a first flexible tube directly fluidically coupling the edge bladder with the first inflation bladder in a first closed unit having a first maximum inflation pressure; and
   a first fixed quantity of a flowable medium contained in the first closed unit at a pressure of less than two-thirds the maximum inflation pressure.

2. The vehicle seat of claim 1, wherein:
   the flexible edge region of the coverstock is moveable between a compressed position and an elevated position; and
   the edge bladder is compressible to permit movement of the edge region into the compressed position.

3. The vehicle seat of claim 2, wherein the edge bladder is compressible by transfer of at least a portion of the first fixed quantity of the flowable medium from the edge bladder to the inflation bladder.

4. The vehicle seat of claim 2, wherein the edge bladder is inflatable by transfer of at least a portion of the first fixed quantity of the flowable medium from the inflation bladder to the edge bladder to provide a retention force to retain the edge region in the elevated position.

5. The vehicle seat of claim 1, further including a seatback rotatably coupled with the cushion.

6. The vehicle seat of claim 5, wherein:
   the seatback is moveable with respect to the cushion, by being rotatably coupled therewith, between an open position and a closed position, the upper region of the seatback being positioned away from the edge region of the cushion when the seatback is in the open position, and a portion of the seatback being in contact with the edge region when the seatback is in the closed position; and
   when in the closed position, the contact between the edge region and the seatback compresses the edge, thereby transferring a portion of the first fixed quantity of the flowable medium from the edge bladder to the inflation bladder.

7. The vehicle seat of claim 1, wherein the cushion further includes a second compressible inflation bladder positioned beneath the coverstock central region, the vehicle seat further including:
   a seatback rotatably coupled with the cushion and defining a flexible upper region and including a compressible upper bladder underlying the upper region and in fluidic communication with the second inflation bladder;
   a second flexible tube directly fluidically coupling the upper bladder with the second inflation bladder in a second closed unit having a second maximum inflation pressure; and
   a second fixed quantity of the flowable medium contained in the second closed unit at a pressure of less than two-thirds the maximum inflation pressure.

8. The vehicle seat of claim 7, wherein the cushion further includes:
   a third compressible inflation bladder positioned beneath the coverstock central region; and;
   a third flexible tube directly fluidically coupling the edge bladder with the second inflation bladder such that the third inflation bladder is included in the first closed unit;
   wherein the first and third compressible inflation bladders positioned on opposing sides of the second inflation bladder.

9. A vehicle seat cushion, comprising:
   a coverstock defining a seat surface with a flexible central region and a flexible edge region;
   a compressible edge bladder beneath the coverstock edge region;
   a compressible inflation bladder beneath the coverstock central region and in fluidic communication with the edge bladder;
   a flexible tube directly fluidically coupling the edge bladder with the inflation bladder in a closed unit having a maximum inflation pressure; and a fixed quantity of a flowable medium contained in the closed unit at a pressure of less than two-thirds the maximum inflation pressure.

10. The seat cushion of claim 9, wherein:
the inflation bladder is compressible from a neutral state to a compressed state; and
when the inflation bladder is in the neutral state, the coverstock edge region is compressible from an elevated position to a compressed position by compression of the edge bladder causing at least partial transfer of the fixed quantity of flowable medium from the edge bladder to the inflation bladder.

11. The seat cushion of claim 10, wherein when the inflation bladder is in the compressed state, at least a portion of the fixed quantity of flowable medium flows from the inflation bladder to the edge bladder, thereby providing a supporting force within the edge bladder to maintain the edge region of the coverstock in the elevated position.

12. The seat cushion of claim 9, wherein the inflation bladder and the edge bladder are fluidically coupled by a tube in fluidic communication with the edge bladder at a first end thereof and the inflation bladder at a second end thereof.

13. A vehicle seat, comprising:
a cushion including an edge bladder within an edge region thereof and an inflation bladder within the cushion remote from the edge region, a flexible tube directly fluidically coupling the edge bladder with the inflation bladder;
a seatback rotatably coupled with the cushion and including an upper bladder within an upper region thereof; and
a second flexible tube directly fluidically coupling the upper bladder with the inflation bladder;
wherein the inflation bladder, the edge bladder, the upper bladder, and the first and second tubes define a closed unit having a maximum inflation pressure and containing a fixed quantity of a flowable medium at a pressure of less than two-thirds the maximum inflation pressure.

14. The vehicle seat of claim 13, wherein the fixed quantity of the flowable medium is partially transferrable between the inflation bladder and the edge bladder and between the inflation bladder and the upper bladder.

15. The vehicle seat of claim 13, wherein:
the inflation bladder is compressible from a neutral state to a compressed state; and
when the inflation bladder is in the neutral state, the edge region of the cushion is compressible from an elevated position to a compressed position by compression of the edge bladder causing at least partial transfer of the fixed quantity of the flowable medium from the edge bladder to the inflation bladder.

16. The vehicle seat of claim 15, wherein when the inflation bladder is in the neutral state, the upper region of the seatback is compressible from an extended position to an inward position by compression of the upper bladder causing at least partial transfer of the fixed quantity of the flowable medium from the edge bladder to the inflation bladder.

17. The vehicle seat of claim 15, wherein when the inflation bladder is in the compressed state:
a first portion of the fixed quantity of the flowable medium flows from the inflation bladder to the edge bladder to support the edge region in the elevated position; and
a second portion of the fixed quantity of the flowable medium flows from the inflation bladder to the upper bladder to support the upper region in the extended position.

18. The vehicle seat of claim 13, wherein:
the seatback is moveable with respect to the cushion, by being rotatably coupled therewith, between an open position and a closed position, the upper region of the seatback being positioned away from the edge region of the cushion when the seatback is in the open position, and the upper region being in contact with the edge region when the seatback is in the closed position; and
when in the closed position, the contact between the edge region and the upper region compresses the edge bladder and the upper bladder, thereby transferring portions of the fixed quantity of the flowable medium respectively from the upper bladder and the edge bladder to the inflation bladder.

* * * * *